INVENTOR
JACK THOMAS INAMORATO

INVENTOR
JACK THOMAS INAMORATO

ATTORNEYS

United States Patent Office 3,696,056
Patented Oct. 3, 1972

3,696,056
TERNARY FOAM CONTROL SYSTEMS WITH AMINES OR AMIDES AND DETERGENT COMPOSITIONS CONTAINING SAME
Jack Thomas Inamorato, Westfield, N.J., assignor to Colgate-Palmolive Company, New York, N.Y.
Continuation-in-part of application Ser. No. 41,308, which is a continuation-in-part of applications Ser. No. 41,359, and Ser. No. 41,601, all May 28, 1970. This application May 28, 1970, Ser. No. 41,392
Int. Cl. B01d 19/04; C11d 3/065, 3/26
U.S. Cl. 252—525
32 Claims

ABSTRACT OF THE DISCLOSURE

A detergent composition having excellent foam control at low and high temperatures is disclosed, as well as a ternary composition for accomplishing this result when added to a detergent system. The controlled suds are provided by a synergistic mixture of a fatty acid, a polyethoxylated linear alcohol and a high molecular weight amide or a primary, secondary or tertiary amine.

---

Figure 1:
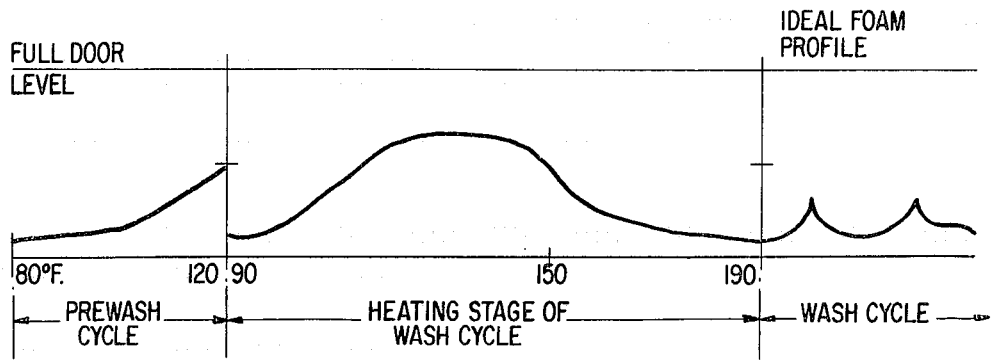

This application is a continuation-in-part of copending application Ser. No. 41,308 which, in turn, is a continuation-in-part of copending applications Ser. No. 41,359 and Ser. No. 41,601, filed May 28, 1970 (all three cases) respectively.

This invention relates to detergent compositions. More particularly, this invention relates to detergent compositions having a controlled suds relationship at low as well as high temperatures and to a ternary control system for accomplishing this result.

The use of synthetic detergents for washing clothes has assumed worldwide importance due to the efficiency and cheapness of such products. These detergents are compounded with various additives to provide compositions having improved and desirable characteristics. Among these characteristics is that of maintaining a proper level of foam for suds.

Foaming, or sudsing, of detergents is an extremely important factor to consider when formulating a detergent composition. It is known, for example, that a detergent which overfoams does not do an efficient job of cleaning in a washing machine. On the other hand, in hand washing there is a desire on the part of most consumers for a substantial amount of foam produced by a detergent. It is therefore necessary to provide a detergent composition which produces enough foam to reassure the consumer, but yet not so much foam as to inhibit the detergent action of the composition. This need has been satisfactorily achieved in many ways.

There is, however, another situation which requires a totally different approach to foam control in a detergent system. There are geographical areas where hot water is not readily available for one reason or another. In such areas, as well as others washing machines are designed with internal water heating systems which begin their cycle with cold water and gradually heat the same to the desired operating temperature which is usually the "boil." Such washing machines are used extensively, for instance, in many European countries. It is well known, however, that a detergent system which provides an adequate level of foam when used with hot water will not foam at all in cold water. Conversely, a detergent system which is compounded so that a sufficient level of foam is produced in cold water will overfoam to the extent of overflowing the washing machine when used with hot water. Of course, a detergent system which over-foams can have a foam suppressor included therein. The problem then, naturally, is that such a system will produce no foam when used with cold water. In other words, most detergent systems have essentially a direct relationship between temperature and foam, wherein as the temperature increases the amount of foam increases.

In the aforementioned co-pending application Ser. No. 41,359, there is described a synergistic mixture of a fatty acid and a polyethoxylated quaternary ammonium salt which provides control of the foam profile characteristic of a detergent system. A detergent system incorporating this synergistic mixture was found to give desirable foam characteristics at both low temperature and high temperatures. It was later found, however, that this binary foam control system had certain shortcomings which showed up at particularly high temperatures. When the temperature of the wash water exceeded about 200° F., overfoaming occurred. This problem was recognized and solved by the invention disclosed and claimed in the aforementioned co-pending application Ser. No. 41,601. The problem of extremely high temperature over-foaming was solved in the invention claimed in the latter application by the use of a ternary foam suppressing system, which consisted essentially of a synergistic mixture of a fatty acid, a polyethoxylated quaternary ammonium salt, and a member of a particular group of oxazolines having the general formula

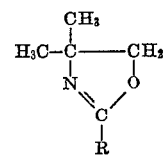

wherein R represents an alkyl group having from about 15 to about 21 carbon atoms.

While this ternary system gave greatly improved results over the binary system of the earlier application, it was found that when both the pre-wash and the wash cycles of a particular type of washing machine were used, there was a tendency to over-foam at the extremely high temperatures sometimes encountered at the end of the wash cycle. The aforementioned co-pending application Ser. No. 41,308 solved this problem by providing a ternary synergistic mixture of a fatty acid, a member of the group of oxazolines having the formula

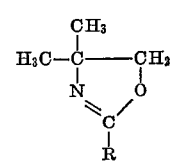

wherein R represents an alkyl group having from about 15 to about 21 carbon atoms, and a polyethoxylated linear alcohol. By using this ternary synergistic mixture in an anionic detergent system, the foam profile was found to approximate what is considered ideal for such a system under the aforementioned conditions of use.

While the ternary synergistic mixture described and claimed in the aforemention copending application Ser. No. 41,308 was found to provide the desired results, certain economic factors made its use somewhat limited. These factors include availability and cost of certain of the ingredients. Accordingly, it became apparent that a need still existed for a detergent system which would provide the desired foam profile, as well as for a foam control composition to impart such properties to a detergent system. This need has been fulfilled according to the present invention by providing a ternary foam-control composition comprising a synergistic mixture of a fatty acid, a polyethoxylated linear alcohol and a high molecular weight amide or amine.

Accordingly, it is a primary object of the present invention to provide a detergent system free of the aforementioned and other such disadvantages.

It is another object of the present invention to provide a detergent system having an inverse foam-to-temperature relationship.

It is a further object of the present invention to provide a detergent system which can be used in an environment wherein it will be subject to cold water as well as hot water and still provide a satisfactory foam level.

It is still another object of the present invention to provide a composition which will impart an inverse foam-to-temperature relationship to a detergent system.

It is yet another object of the present invention, consistent with the foregoing objects, to provide means for achieving the desired foam control of a detergent system using ingredients which are economical and readily available.

Other objects and advantages of the present invention will become apparent from the following detailed description thereof.

According to the present invention, a composition is provided for regulating the foam profile of a detergent system comprising a ternary synergistic mixture of a fatty acid, a polyethoxylated linear alcohol, and a high molecular weight amide or amine.

The useful fatty acids which may be employed in the present invention include those saturated linear acids containing between about 8 and 30 carbon atoms in their alkyl chain. These include:

| | |
|---|---|
| capric acid | behenic acid |
| lauric acid | lignoceric acid |
| myristic acid | cerotic acid |
| palmitic acid | melissic acid |
| stearic acid | oleic acid |
| arachidic acid | linoleic acid | as well as various natural and synthetic mixtures thereof.

The preferred fatty acids, however, are those having alkyl chains of from about 14 to 22 carbon atoms. One such preferred fatty acid is stearic acid. Another preferred acid composition is available commercially under the name "Hyfac 431." Hyfac 431 is a hydrogenated fish fatty acid having the following approximate composition:

| | Percent |
|---|---|
| Myristic acid | 8 |
| Palmitic acid | 29 |
| Stearic acid | 18 |
| Arachidic acid | 26 |
| Behenic acid | 17 |
| Oleic acid | 2 |

Other commercially available mixtures of fatty acids are those which are available under the name "Hystrene." For instance, Hystrene 7022 comprises about 70% $C_{20}$ to $C_{22}$ fatty acids, Hystrene 9022 has at least 90% $C_{20}$ to $C_{22}$ acids, and Hystrene 9018 has about 90% stearic acid. Another such commercial product is "Neofat 18–58," which is a hydrogenated tallow acid. The fatty acid, used in combination with the polyethoxylated linear alcohol and the amine or amide, should be present in the final detergent composition in an amount from about 1 to about 6 percent by weight of the total detergent composition.

The polyethyloxylated linear alcohol is a non-ionic surfactant having a linear alkyl chain length of from about 12 to about 20 carbon atoms. A preferred such non-ionic surfactant is a polyethoxylated (11 moles) linear alcohol. Other suitable polyethoxylates having about 8 to 60 moles, preferably 10 to 50 moles ethylene oxide may be used.

The third component of the synergistic ternary foam-suppressing system is a high molecular weight amine or amide. By "high molecular weight" amine or amide is meant a primary, secondary, or tertiary amine or an amide having a saturated or unsaturated alkyl chain of from about 14 to about 22 carbon atoms. In particular, amides which have been found to be useful in the present invention are behenamide and erucamide. Amines which were found particularly useful are products by Humko available under the name "Kemamine." Representative of these are:

Kemamine S–970—di-hydrogenated tallow amine
Kemamine S–190—di-arachidyl/benhenyl amine
Kemamine P–190—arachidyl/behenyl amine While primary, secondary and tertiary amines all work in the composition of the present invention, the preferred amines are the secondary and tertiary amines. Still more preferred are the secondary amines.

The useful detergents which may be used in conjunction with the foam profile regulating composition of the present invention include anionic detergents such as alkylbenzenesulfonic acid and its salts, and compounds of the formula alkyl-phenyl-$So_3$-M, wherein alkyl is an alkyl radical of a fatty acid and M is hydrogen or an alkali metal, which compounds comprise a well-known class of anionic detergents and include sodium dodecyl benzene sulfonate, potassium dodecylbenzene-sulfonate, sodium laurylbenzenesulfonate, sodium cetylbenzenesulfonate. Others are the alkali metal dialkyl sulfosuccinates, e.g., sodium dioctylsulfosuccinate, sodium dihexylsulfosuccinate, sodium sulfoethylphthalate, sodium lauryl-p-anisidinesulfonate, sodium tetradecanesulfonate, sodium diisopropylnaphthalenesulfonate, sodium octylphenoxyethoxyethylsulfonate, etc., and the alkali metal alkyl sulfates, e.g., sodium lauryl sulfate.

Among the above-noted alkylbenzene-sulfonic acid and salts thereof, the preferred compounds included those which are biodegradable and which are particularly characterized by a linear alkyl substituent of from $C_8$ to $C_{22}$ and preferably from $C_{10}$ to $C_{15}$. It is, of course, understood that the carbon chain length represents, in general, an average chain length since the method for producing such products usually employs alkylating reagents of mixed chain length. It is clear, however, that substantially pure olefins as well as alkylating compounds used in other techniques can and do give alkylated benzene sulfonates wherein the alkyl moiety is substantially (i.e., at least 99%) of one chain length, i.e., $C_{12}$, $C_{13}$, $C_{14}$, or $C_{15}$. The linear alkyl benzene sulfonates are further characterized by the position of the benzene ring in the linear alkyl chain, with any of the position isomers (i.e., alpha to omega) being operable and contemplated.

The linear alkyl benzene sulfonates are generally and conveniently prepared by sulfonating the corresponding alkyl benzene hydrocarbons which in turn may be prepared by alkylating benzene with a linear alkyl halide, a 1-alkene or a linear primary or secondary alcohol. Pure isomers (of the 1-phenyl isomer) are prepared by reduction of the acylated benzene (alkyl phenyl ketone) using a modification of the Wolff-Keshner reaction. The 2-phenyl isomer is obtained from n-undecyl phenyl ketone and methyl magnesium bromide to form the tertiary alcohol which is dehydrated to the alkene and then hydrogenated. The 5-phenyl isomer is obtained similarly from a n-heptyl phenyl ketone and n-butyl magnesium bromide. The other isomers are obtained in a similar manner from the appropriate n-alkyl phenyl ketone and n-alkyl magnesium bromide.

In addition to the benzene sulfonates, one may also employ the lower alkyl ($C_1$ to $C_4$) analogs of benzene such as toluene, xylene, the trimethyl benzenes, ethyl benzene, isopropyl benzene, and the like. The sulfonates are generally employed in the water-soluble salt form, which includes as the cation the alkali metals, ammonium, and lower amine and alkanolamine.

Examples of suitable linear alkyl benzene sulfonates are:

sodium n-decyl benzene sulfonate
sodium n-dodecyl benzene sulfonate
sodium n-tetradecyl benzene sulfonate
sodium n-pentadecyl benzene sulfonate
sodium n-hexadecyl benzene sulfonate and the lower corresponding lower alkyl substituted homologues of benzene as well as the salts of the cations previously referred to. Mixtures of these sulfonates may, of course, also be used with mixtures which may include compounds wherein the linear alkyl chain is smaller or larger than indicated herein provided that the average chain length in the mixture conforms to the specific requirements of $C_{10}$ to $C_{22}$.

Other anionic detergents are the olefin sulfonates, including long chain alkene sulfonates, long chain hydroxyalkane sulfonates or mixtures of alkenesulfonates and hydroxyalkanesulfonates. These olefin sulfonate detergents may be prepared, in known manner, by the reaction of $SO_3$ with long chain olefins (of 8–25, preferably 12–21, carbon atoms) of the formula $RCH=CHR_1$, where R is alkyl and $R_1$ is alkyl or hydrogen, to produce a mixture of sultones and alkenesulfonic acids, which mixture is then treated to convert the sultones to sulfonates.

The linear paraffin sulfonates are also a well-known group of compounds and include water-soluble salts (alkali metal, amine, alkanolamine, and ammonium) of:

1-decane sulfonic acid
1-dodecane sulfonic acid
1-tridecane sulfonic acid
1-tetradecane sulfonic acid
1-pentadecane sulfonic acid
1-hexadecane sulfonic acid as well as the other position isomers of the sulfonic acid group.

In addition to the paraffin sulfonates illustrated above, others with the general range of $C_{10}$ to $C_{22}$ alkyls may be used, with the most preferable range being from $C_{12}$ to $C_{20}$.

The linear alkyl sulfates which are contemplated in this invention comprise the range of $C_{10}$ to $C_{20}$. Specific examples include sodium n-decyl sulfate, sodium n-dodecyl sulfate, sodium n-octadecyl sulfate, and the ethoxylated (1 to 100 moles ethylene oxide) derivatives, and, of course, the other water-soluble salt-forming cations mentioned above.

The composition of the present invention may also include, in addition to the foam profile, regulating compounds and conventional anionic detergent compositions, builders, brighteners, hydrotropes, germicides, soil suspending agents, anti-redeposition agents, antioxidants, bleaches, coloring materials (dyes and pigments), perfumes, water-soluble alcohols, non-detergent alkali metal benzene sulfonates, fabric softening compounds, enzymes, etc.

The builder is, generally, a water-soluble, inorganic salt which may be a neutral salt; e.g., sodium sulfate or an alkaline builder salt such as phosphates, silicates, bicarbonates, carbonates, and borates. The preferred builders are those characterized as condensed phosphates such as polyphosphates and pyrophosphates. Specific examples of alkaline salts are: tetrasodium pyrophosphates, pentasodium tripolyphosphate (either Phase I or Phase II), sodium hexametaphosphate, and the corresponding potassium salts of these compounds, sodium and potassium silicates; e.g., sodium metasilicate and alkaline silicates ($Na_2O$; $2SiO_2$ and $Na_2O$; $3SiO_2$) sodium carbonate, potassium carbonate and sodium and potassium bicarbonate. Other salts may also be used where the compounds are water-soluble. These include the general class of alkali metal, alkaline earth metal, amine, alkanolamine, and ammonium salts. Other builders which are salts of organic acids may also be used, and in particular, the water-soluble (alkali metal, ammonium, substituted ammonium and amine) salts of aminopolycarboxylic acids such as:

ethylene diamine tetra-acetic acid
nitrilo triacetic acid
diethylene triamine penta-acetic acid
N-(2-hydroxyethyl)-ethylene diamine triacetic acid
2-hydroxyethyl-iminodiacetic acid
1,2-diaminocyclohexane diacetic acid, and the like.

In addition to the above ingredients, one may as previously delineated employ hydrotropes in connection with the compositions of the instant invention. The useful hydrotropes include such compounds as sodium xylene sulfonate, potassium xylene sulfonate, sodium and potassium toluene sulfonates, in the position isomers thereof, and ethyl benzene sulfonate.

It has now been found that when the synergistic mixture of a fatty acid, a polyethoxylated linear alcohol, and a high molecular weight amine or amide as disclosed above is added to a conventional detergent system, or is used in combination with the above detergents and other conventional detergent additives, an inverse foam-to-temperature relationship is exhibited by the resulting system.

In the composition for regulating the foam profile of a detergent according to the present invention, there is employed from about 20 to 80 percent fatty acid, from about 10 to 60 percent polyethoxylated linear alcohol, and from about 10 to about 60 percent amine or amide. Preferably, there is employed from about 35 to 60 percent fatty acid, from about 20 to 40 percent polyethoxylated linear alcohol, and from about 20 to about 40 percent amine or amide. In terms of the total detergent system, there is employed from about 1 to 6 percent fatty acid, from about 1 to 6 percent polyethoxylated linear alcohol, and from about 1 to about 6 percent amine or amide, and preferably from about 2 to 5 percent fatty acid, from about 1 to 3 percent polyethoxylated linear alcohol, and from about 1 to about 3 percent amine or amide. All of said percentages are by weight, based on the total amount of the composition being used. In the case of the detergent systems, the percentages are based on an anionic detergent concentration of about 8 to 18 percent by weight. When less anionic detergent is present in the system, a correspondingly lesser amount of each of the fatty acid, the polyethoxylated linear alcohol, and amine/amide can be used. Builders when used may range from 10–85 wt. percent.

The present invention will now be illustrated by the following, more detailed examples thereof. It is noted, however, that the present invention is not deemed as being limited thereto.

The following examples demonstrate the foam profiles of various detergent systems under the conditions of use to be encountered in Europe. The detergent compositions were tested in a Miele automatic washing machine, which is of German manufacture. The machine is a front-loading, tumbler-type washing machine equipped with a heater that raises the water temperature from room temperature to the boil. The machine operates on 220 volts, 50-cycle alternating current. In each instance, the machine was set on the white clothes setting, and a five-pound load of clean clothing was used. The water capacity is 11 liters. A detergent concentration of 0.5% was used in each cycle. This detergent concentration was provided by using 56 grams of detergent.

The machine operates on two cycles, a pre-wash cycle and a wash cycle. In the pre-wash cycle, the temperature of the water climbs from 70 to 120° F., and the total cycle is 12 to 14 minutes. The drum rotates for about 10 seconds, rests for 4 seconds, reverses direction, and the operation is repeated. At the end of the cycle, the machine stops, drains, and remains "motionless" unless the wash cycle starts.

The wash cycle is divided into two stages, the heating stage and the washing stage. In the heating stage, cold water washes a second charge of detergent into the drum. During this 30-minute stage, the temperature climbs from about 90° F. to over 190° F. The drum rotates for 4 to 5 seconds, rests for 10 seconds, reverses direction, and repeats the operation. At the end of the heating period, the machine changes its drum action and goes into the washing stage.

The washing stage lasts 18 minutes. During this time, the drum action is the same as that described for the pre-wash cycle. The temperature fluctuates between 190 and 200° F. during the whole washing stage.

EXAMPLE 1

A basic formula was used in the following test having the following composition:

| Ingredient | Percent |
|---|---|
| Water | 8.5 |
| Linear alkylbenzene sulfonate (tridecyl)[1] | 10.0 |
| Sodium tripolyphosphate | 35.0 |
| Sodium perborate tetrahydrate | 30.0 |
| Sodium silicate | 7.0 |
| Foam suppressing system, | |
| Sodium sulfate, CMC | |
| Brighteners, q.s. | |

[1] Sodium salt.

This basic detergent system was tested according to the foregoing procedure in the Miele washing machine. The foam profile was determined as a function of the temperature of the wash water and of the foam height as observed through the washing machine door.

The ideal foam profile is shown in FIG. 1, wherein as the temperature rises from 70 to about 120° F. in the pre-wash cycle the amount of foam increases to about half-way up the washing machine door. In the heating stage of the wash cycle, the amount of foam reaches approximately half-way at a temperature of between about 120 and 150° F. and then drops so that by the time the water has reached the operating temperature the amount of foam has decreased. During the wash cycle, the amount of foam remains relatively constant with minor fluctuation.

Figure 2:
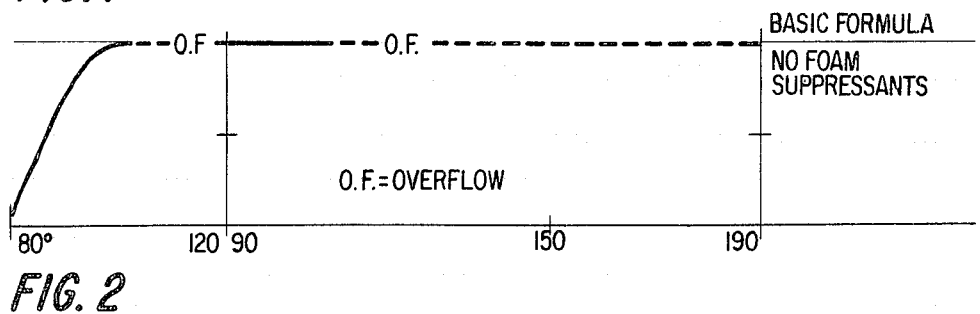

As can be seen from FIG. 2, the basic detergent system containing no foam suppressors produces a rapid rise in the amount of foam to the point of overflowing the machine. This condition is unsatisfactory.

EXAMPLE 2

Figure 3:
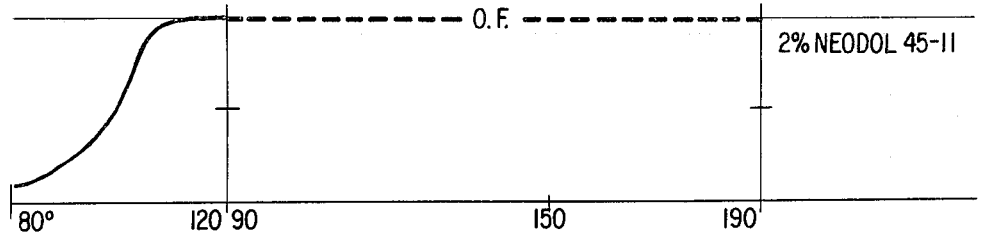
Figure 4:
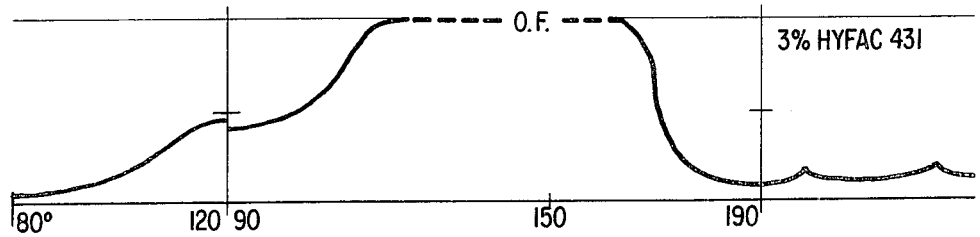
Figure 5:
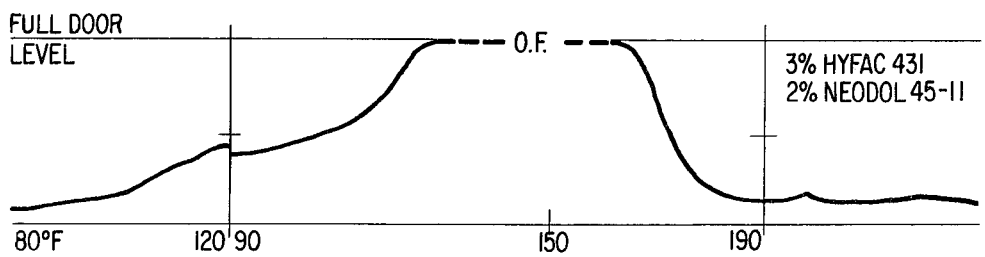

A detergent system was prepared according to the formula of Example 1. This system included 2 percent Neodol 45–11 (polyethoxylated (11 moles) linear alcohol).[1] The detergent system was tested according to the procedure set forth above. As can be seen from FIG. 3, the washing machine overflowed within a short time demonstrating that the Neodol alone does not provide the necessary effect on the foam profile of the detergent system.

[1] Primarily $C_{14}$–$C_{15}$.

EXAMPLE 3

Four detergent systems were formulated having the following composition:

| | 1 | 2 | 3 | 4 |
|---|---|---|---|---|
| Water | 8.5 | 8.5 | 8.5 | 8.5 |
| Sodium Alkylbenzene sulfonate (tridecyl) | 10.0 | 10.0 | 10.0 | 10.0 |
| Sodium tripolyphosphate | 35.0 | 35.0 | 35.0 | 35.0 |
| Sodium perborate tetrahydrate | 30.0 | 30.0 | 30.0 | 30.0 |
| Sodium silicate | 7.0 | 7.0 | 7.0 | 7.0 |
| Sodium carboxymethyl cellulose | 0.5 | 0.5 | 0.5 | 0.5 |
| Sodium hydroxide | 0.4 | 0.4 | 0.4 | 0.4 |
| Hyfac 431 [1] | 3.0 | 3.0 | 3.0 | 3.0 |
| Erucamide | | | 2.0 | |
| Methyl di-hydrogenated tallow amine | | | | 2.0 |
| Neodol 45–11 [2] | | 2.0 | 2.0 | 2.0 |
| Polyvinyl alcohol | 0.2 | 0.2 | 0.2 | 0.2 |
| Sodium sulfate | 5.4 | 3.4 | 1.4 | 1.4 |

[1] Hydrogenated fish fatty acid.
[2] Polyethoxylated (11 moles) linear alcohol.

Each of these systems was tested in a Miele washing machine according to the above-described procedure and the foam profiles were determined. The results are shown in FIGS. 4, 5, 6, and 7, respectively. As can be readily seen, the acid alone, while it did not cause overflowing in the pre-wash cycle, did readily overflow in the wash cycle although eventually the foam level dropped. The Neodol alone also overflowed early in the test.

The combination of Hyfac and Neodol also overflowed in the wash cycle in much the same way as the Hyfac alone.

Figure 6:
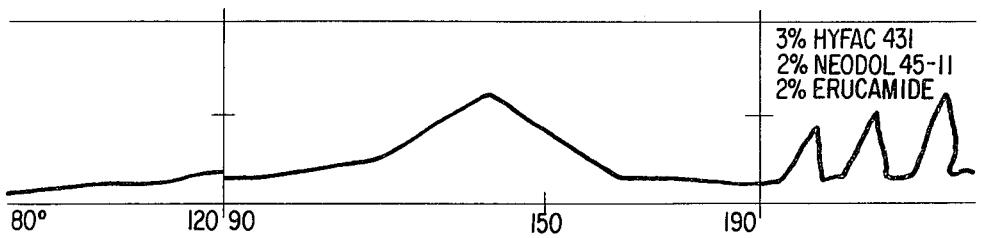
Figure 7:
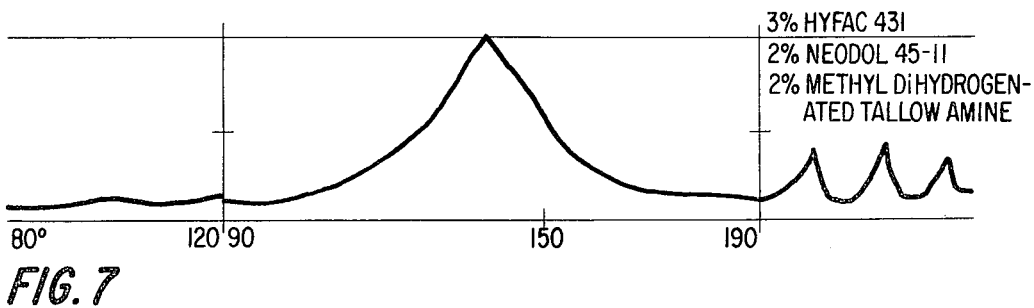
Figure 8:
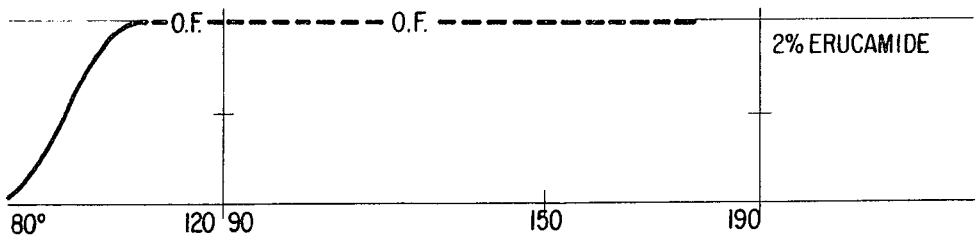
Figure 9:
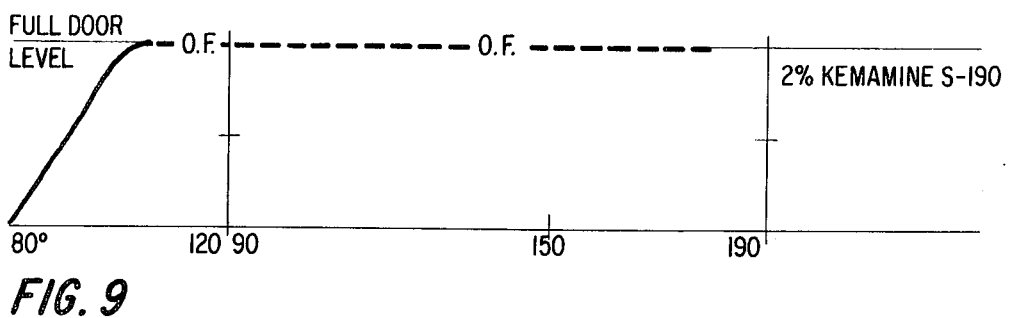
Figure 10:
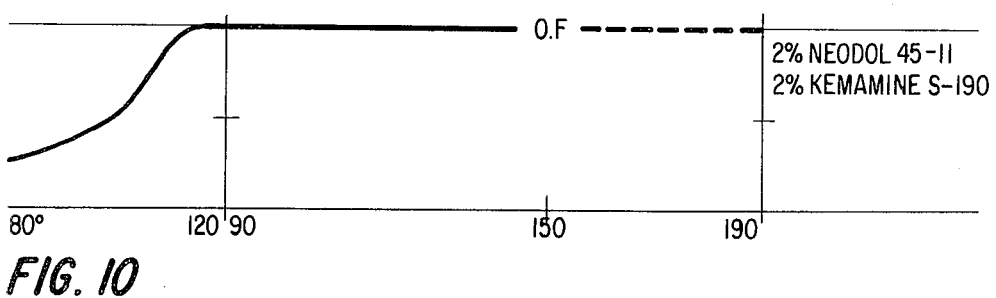
Figure 11:
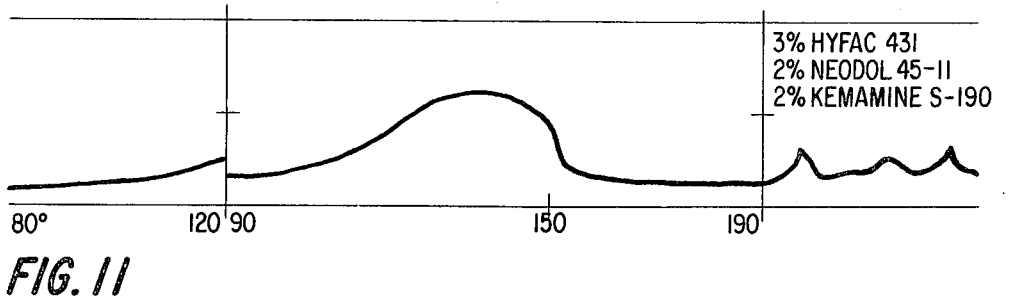
Figure 12:
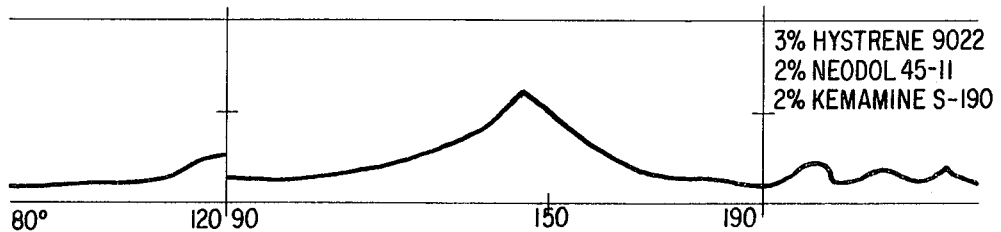
Figure 13:
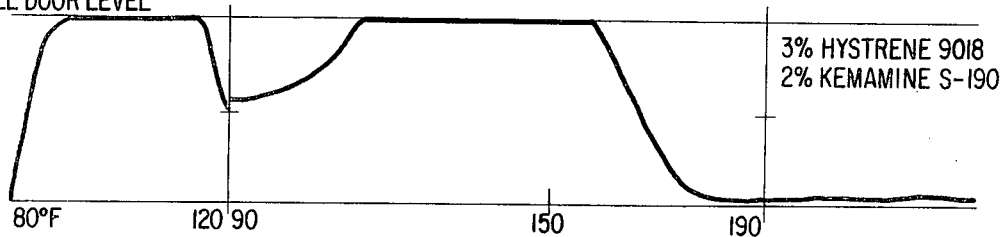
Figure 14:
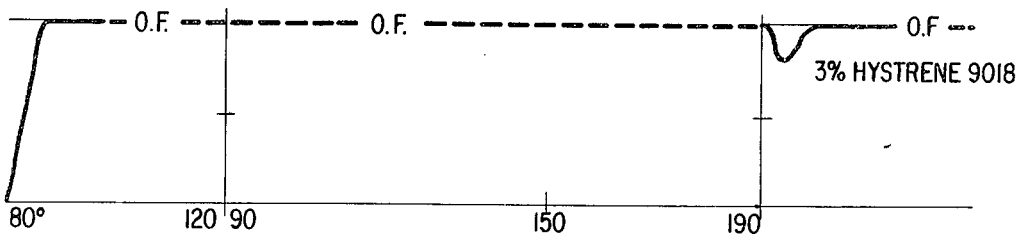
Figure 15:
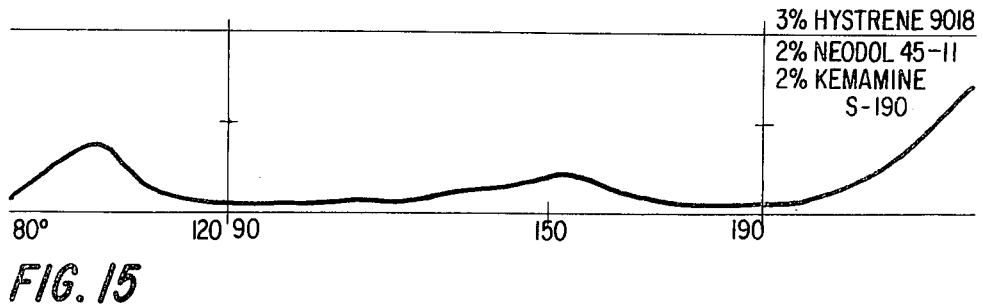
Figure 16:
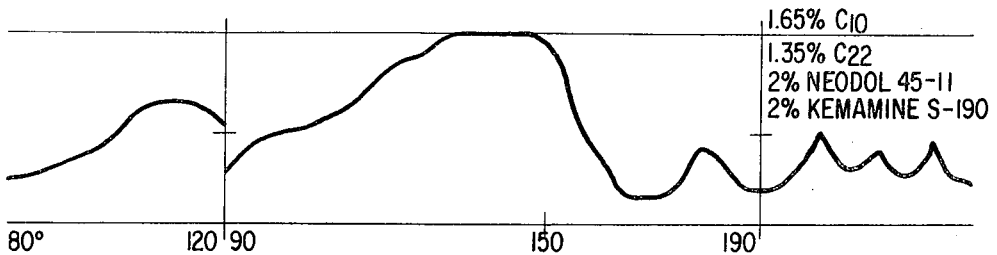
Figure 17:
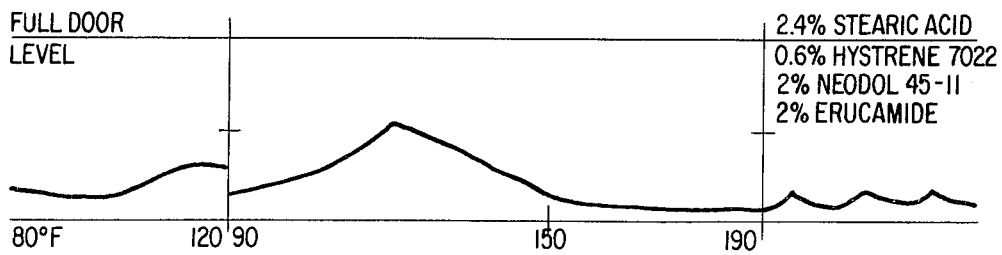
Figure 18:
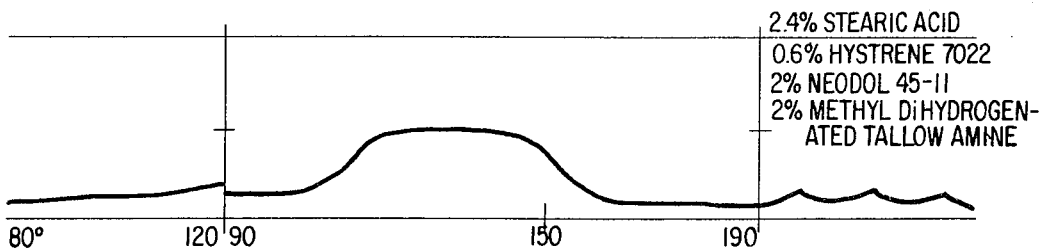

The system containing the ternary synergistic mixture of the present invention demonstrated a foam profile approximating the ideal profile set forth in FIG. 1 as shown in FIGS. 6 and 7.

Thus, it is immediately clear that any one of the three ingredients of the inventive ternary system alone does not achieve the desired result, nor does a combination of two of the ingredients. The ideal foam profile is achieved only by using the synergistic combination of the fatty acid, the polyethoxylated linear alcohol, and the fatty amine or amide.

EXAMPLES 4–14

Detergent systems were formulated as in Example 3, but substituting various acids and various amines and amides. Each of these was evaluated in the same manner as the other detergent systems. The foam control system ingredients are set forth below:

| Example | 3% acid | Neodol, percent | 2% amine or amide | Drawing figure |
|---|---|---|---|---|
| 4 | | | Erucamide | 8 |
| 5 | | | Kemamine S-190 | 9 |
| 6 | | 2 | do | 10 |
| 7 | Hyfac 431 | 2 | do | 11 |
| 8 | Hystrene 9022 | 2 | do | 12 |
| 9 | Hystrene 9018 | 2 | do | 13 |
| 10 | do | | | 14 |
| 11 | do | 2 | Kemamine S-190 | 15 |
| 12 | Decanoic, 1.65% plus dodecanoic, 1.35%. | 2 | do | 16 |
| 13 | Hystrene 7022, 0.6% plus stearic, 2.4%. | 2 | Erucamide | 17 |
| 14 | Hystrene 7022, 0.6% plus stearic, 2.4%. | 2 | Methyldihydrogenated tallow amine. | 18 |

Referring to FIGS. 8 through 18, it will be seen that in each instance wherein an amine or amide alone was used, overflowing occurred. In the instance where an amine was used in combination with the polyethoxylated alcohol but without a fatty acid, overflowing also occurred. However, when the synergistic ternary mixture of the present invention was used, there was no overflowing and the foam profiles to one extent or another approximated the ideal.

In the description and claims, reference to fatty acids or the like includes the corresponding water-soluble soaps thereof, preferably the alkali metal soaps such as sodium and potassium. In general, the fatty acids per se and soaps thereof may be used interchangeably depending upon economics, method of manufacture of the composition with other ingredients and its use in washing. For example, fatty acids may exist in the product when post-added to a detergent powder; or partly or wholly in the form of soap when added to a slurry or solution during manufacture of detergent products in the presence of alkaline materials or in alkaline washing solutions.

Thus, it can be seen that the objects set forth at the outset have been successfully achieved. The present invention has been described with reference to certain embodiments thereof which are to be considered as exemplary, the invention being limited only by the claims.

What is claimed is:

1. A composition for regulating the foam profile of a detergent system, said composition consisting essentially of (1) from about 20 to 80% by weight of a saturated linear fatty acid containing between about 8 and 30 carbon atoms in the alkyl chain, (2) from about 10 to 60% by weight of a non-ionic, $C_{12}$ to $C_{20}$ polyethoxylated linear alcohol containing from about 8 to 60 moles of ethylene oxide, and (3) from about 10 to about 60% by weight of a primary, secondary, or tertiary amine or an amide having a saturated or unsaturated alkyl chain of from about 14 to about 22 carbon atoms.

2. A composition according to claim 1 wherein said fatty acid contains from about 14 to 22 carbon atoms.

3. A composition according to claim 2 wherein said fatty acid is hydrogenated fish fatty acid.

4. A composition according to claim 2 wherein said fatty acid is a mixture of $C_{20}$ to $C_{22}$ fatty acids.

5. A composition according to claim 1, wherein said fatty acid is present in from about 35 to 60 percent by weight of said composition.

6. A composition according to claim 1, wherein said alcohol is a polyethoxylated linear alcohol containing 11 moles ethylene oxide.

7. A composition according to claim 1 wherein said alcohol is present in from about 20 to 40 percent by weight of said composition.

8. A composition according to claim 1, wherein (3) is a primary amine.

9. A composition according to claim 8, wherein (3) is methyl di-hydrogenated tallow amine.

10. A composition according to claim 1, wherein (3) is a secondary amine.

11. A composition according to claim 10 wherein (3) is arachidyl-behenyl amine.

12. A composition according to claim 1, wherein (3) is a tertiary amine.

13. A composition according to claim 12, wherein (3) is di-arachidyl-behenyl amine.

14. A composition according to claim 1 wherein (3) is a fatty amide selected from the group consisting of behenamide and ecucamide.

15. A detergent composition having an inverse foam-to-temperature relationship consisting essentially of (1) from about 1 to 6% by weight of a saturated linear fatty acid containing between about 8 and 30 carbon atoms in the alkyl chain, (2) from about 1 to 6% by weight of a non-ionic, $C_{12}$ to $C_{20}$ polyethoxylated linear alcohol containing from about 8 to 60 moles of ethylene oxide, (3) from about 1 to 6% by weight of a primary, secondary or tertiary amine or an amide having a saturated or unsaturated alkyl chain of from about 14 to about 22 carbon atoms, and (4) from about 8 to 18% by weight of a built anionic detergent.

16. A composition according to claim 15, wherein said anionic detergent is a linear alkyl benzene sulfonate having about 8 to 22 carbon atoms in the alkyl group.

17. A composition according to claim 16, wherein said alkyl group of said benzene sulfonate has about 10 to 15 carbon atoms.

18. A composition according to claim 15, wherein the builder salts are selected from the group consisting of alkali metal and ammonium polyphosphates, silicates, borates, sulfates, and combinations thereof.

19. A composition according to claim 15, wherein said fatty acid contains from about 14 to 22 carbon atoms.

20. A composition according to claim 19, wherein said fatty acid is hydrogenated fish fatty acid.

21. A composition according to claim 19, wherein said fatty acid is a mixture of $C_{20}$ to $C_{22}$ fatty acids.

22. A composition according to claim 15, wherein said fatty acid is present in from about 2 to 5 percent by weight of said composition.

23. A composition according to claim 15, wherein said alcohol is a polyethoxylated linear alcohol containing 11 moles ethylene oxide.

24. A composition according to claim 15, wherein said alcohol is present in from about 1 to 3 percent by weight of said composition.

25. A composition according to claim 15, wherein (3) is a primary amine.

26. A composition according to claim 15, wherein (3) is a secondary amine.

27. A composition according to claim 26, wherein (3) is arachidyl-behenyl amine.

28. A composition according to claim 15, wherein (3) is a tertiary amine.

29. A composition according to claim 28, wherein (3) is di-arachidyl-behenyl amine.

30. A composition according to claim 28, wherein (3) is methyl di-hydrogenated tallow amine.

31. A composition according to claim 15 wherein the built anionic detergent is 8–18% $C_8$ to $C_{22}$ alkyl benzene sulfonate and 10–85% builder.

32. A composition according to claim 15 wherein (3) is a fatty amide selected from the group consisting of behenamide and ecucamide.

References Cited

UNITED STATES PATENTS

| | | | |
|---|---|---|---|
| 2,854,417 | 9/1958 | Edwards et al. | 252—358 |
| 2,906,712 | 9/1959 | Edwards et al. | 252—321 X |
| 3,238,142 | 3/1966 | Perry | 252—358 |
| 3,285,856 | 11/1966 | Lew | 252—152 |
| 2,954,347 | 9/1960 | St. John et al. | 252—358 X |

OTHER REFERENCES

Matson, T. P.: "Syndets With Alcohol Derivatives," Soap and Chemical Specialties, November 1963.

RICHARD D. LOVERING, Primary Examiner

U.S. Cl. X.R.

252—96, 97, 98, 99, 102, 110, 117, 121, 321, 358, 527, 544, 546